Aug. 12, 1969  S. K. WALD ET AL  3,460,189
GARAGE DOOR ROLLER ASSEMBLY
Filed March 8, 1967
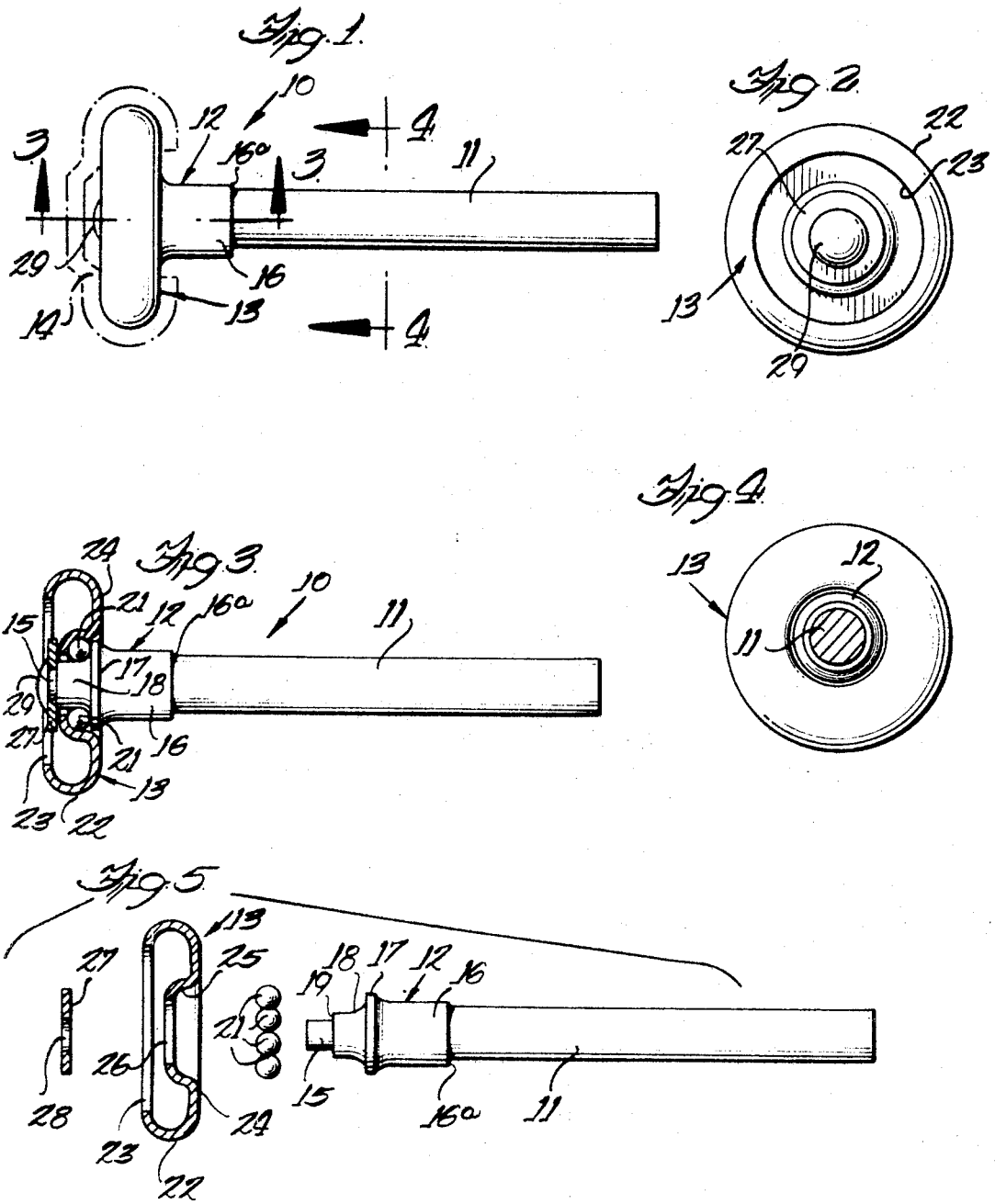

United States Patent Office 3,460,189
Patented Aug. 12, 1969

3,460,189
GARAGE DOOR ROLLER ASSEMBLY
Samuel K. Wald and Robert M. Whittom, Rockford, Ill., assignors to Keystone Consolidated Industries, Inc., a corporation of Delaware
Filed Mar. 8, 1967, Ser. No. 621,483
Int. Cl. E05d 13/02
U.S. Cl. 16—98                                  4 Claims

ABSTRACT OF THE DISCLOSURE

Roller assemblies for an overhead garage door which are received in suitable tracks along both sides of the door, each roller assembly having a one-piece headed axle, a one-piece formed sheet metal roller, a plurality of ball bearings for the roller and a retaining washer to hold the roller and ball bearings on the axle. When assembled, the end of the axle is headed by means of a spinning operation.

The present invention relates to a roller assembly for an overhead garage door moving in one of a pair of parallel tracks for the door, and more particularly to a simplified roller assembly utilizing a minimum of material, parts and fabrication operations.

Among the objects of the present invention is the provision of a simplified roller assembly for an overhead garage door utilizing a minimum of parts, which comprises a one-piece cold headed axle or stem, a one-piece formed and drawn sheet metal wheel or roller, a plurality of ball bearings appropriate to the hub diameter of the axle, and a washer to hold the wheel and the ball bearings in their proper relation to the axle.

Another object of the present invention is the provision of a simplified roller assembly for an overhead garage door which requires a minimum of operations for fabrication and assembly. The axle is formed from a hot rolled rod that is cold headed to form the hub and an adjacent reduced end. The roller or wheel is drawn, pierced and formed from a sheet metal blank. To assemble, the ball bearings, roller and washer are placed on the hub and the reduced end is upset by a spinning operation.

Further objects are to provide a construction of maximum simplicity, efficiency, economy and ease of assembly, and such further objects, advantages and capabilities as will later more fully appear and are inherently possessed thereby.

In the drawing:
FIG. 1 is a side elevational view of a simplified roller assembly for use on an overhead garage door.
FIG. 2 is an end elevational view of the roller assembly taken from the left-hand end of FIG. 1.
FIG. 3 is a cross sectional view of the roller assembly taken on the line 3—3 of FIG. 1 but with the axle shown in elevation.
FIG. 4 is a cross sectional view taken on the line 4—4 of FIG. 1.
FIG. 5 is an exploded view of the roller assembly similar to FIG. 3.

Referring more particularly to the disclosure in the drawing wherein is shown an illustrative embodiment of the present invention, FIG. 1 discloses a roller assembly 10 having an axle or stem 11 with an enlarged hub 12 rotatably supporting a wheel or roller 13 that is adapted to move in a generally C-shaped track 14 at one side of a garage door (not shown). The garage door is usually provided with tracks 14 at the opposite sides of the door frame and the roller assemblies 10 are suitably secured on the interior surface of the door as by axle supporting brackets.

As more clearly seen in FIGS. 3 and 5, the axle 11 is formed from a piece of hot rolled rod with the end cold headed or upset to form the hub 12 and a reduced cylindrical end 15. The hub 12 has an enlarged cylindrical portion 16 starting at shoulder 16ª which provides a lower limit of spacing of the roller from a supporting bracket; which then enlarges to a flange 17 and then diminishes so as to form a curved surface 18 providing one arcuate surface of a ball race, and then terminates in a shoulder 19 defining the reduced end 15. Received on the curved ball race surface 18 are a plurality of ball bearings 21, the number of ball bearings being appropriate to the diameter of the hub.

Forming the other arcuate or curved surface of the ball race for enclosing the ball bearings 21 is the wheel or roller 13. This roller is formed from a developed blank of a suitable metal drawn, pierced and formed to provide the resulting configuration clearly shown in FIGS. 3 and 5. The roller includes an outer annular periphery or circumference 22 which is curved transversely to form a portion of a toroid. The annular surface 22 terminates at one side in an inturned edge 23 defining an enlarged circular opening. On the opposite or inner side, the surface of the wheel extends radially inwardly as at 24 and then recessed to provide a central depression formed with a curved ball race surface 25 and having a central opening 26.

When assembled, the opening 26 of the roller 13 receives the reduced end 15 of the axle 11 and the curved surface 18 inwardly of the shoulder 19 as seen in FIG. 3. The curved surface 25 of the roller 13 and the curved surface 18 of the hub 12 combine to form the complete ball race for the ball bearings 21; the depression 25 in the roller 13 receiving the flange 17 which may be aligned with the radially extending portion 24 of the roller 13 (see FIG. 3). To retain the roller 13, axle 11 and ball bearings 21 assembled in operative relationship, a washer 27 having an opening 28 to receive the reduced end 15 of the axle 11 is positioned on the end 15 abutting the shoulder 19 of the hub 12, and the extended portion of this end 15 projecting outwardly beyond the washer 27 is upset as by a spinning riveting operation to form an enlarged end 29 to retain the washer and assembled components in operative position.

In use, the roller 13 freely rotates relative to the axle 11 about the ball bearings 21 between the roller and the hub 12. As is well known, several of the roller assemblies 10 may be positioned on each side of the overhead garage door to move in the parallel tracks 14 and guide the movement of the garage door in opening or closing.

Having thus disclosed our invention, we claim:
1. A roller assembly for an overhead garage door, comprising an axle having an enlarged hub portion adjacent one end, said hub including a radially extending flange and a converging curved surface facing and terminating short of the one end in a shoulder, a roller having a central depression facing the hub portion with a central opening therein, said central depression having a curved surface facing the hub, said curved surfaces on said hub and in said depression forming a ball race when the end of the axle is assembled in the roller with said central opening receiving the end of the curved surface on the hub, a plurality of ball bearings located in said ball race, and a retaining washer secured on said one end of the axle to retain the roller thereon.

2. A roller assembly for an overhead garage door, comprising an axle having an enlarged hub portion adjacent a reduced outer end, said hub having a radially extending flange and a converging curved surface terminating short of the reduced end in a shoulder, a roller formed of sheet metal and having an annular curved periphery, a radially extending portion on the inner side of the roller terminating in a central depression with a central opening therein and having a curved surface, and the outer side of said roller terminating in an edge defining an enlarged opening, the curved surfaces in the roller depression and on the hub forming a ball race when the end of the axle is assembled in the roller, a plurality of ball bearings located in said ball race, and a retaining washer received on the reduced outer end of the axle, said reduced end being upset to retain the washer thereon and said washer retaining the axle and roller assembled.

3. A roller assembly for an overhead garage door, comprising an axle having an enlarged hub portion adjacent a reduced outer end, said hub having a radially extending flange and a converging curved surface terminating short of the reduced end in a shoulder, a roller having a central depression with a central opening therein and having a curved surface, said curved surfaces on said hub and in said central depression forming a ball race when the end of the axle is assembled in said roller, a plurality of ball bearings in said ball race, and a retaining washer received on said reduced end of the axle abutting the shoulder on the hub, said central opening in the depression receiving the end of the curved surface on the hub, said reduced end being upset to retain the washer thereon and said washer retaining the axle and roller assembled.

4. A roller assembly as set forth in claim 3, in which said central depression of the roller receives and encompasses the flange on the hub.

References Cited
UNITED STATES PATENTS

| | | | |
|---|---|---|---|
| 855,172 | 5/1907 | Handschumacher | 16—98 X |
| 1,936,902 | 11/1933 | Fleming | 16—98 |
| 3,127,633 | 4/1964 | Schultz | 16—21 |

BOBBY R. GAY, Primary Examiner

ANDREW M. CALVERT, Assistant Examiner

U.S. Cl. X.R.

308—91